(12) United States Patent
Prulhiere et al.

(10) Patent No.: US 9,569,662 B1
(45) Date of Patent: Feb. 14, 2017

(54) IMAGE RECOGNITION AND PARSING

(71) Applicants: David Prulhiere, Grants Pass, OR (US); Terence Bonita, Cebu (PH)

(72) Inventors: David Prulhiere, Grants Pass, OR (US); Terence Bonita, Cebu (PH)

(73) Assignee: David Prulhiere, Grants Pass, OR (US)

( * ) Notice: Subject to any disclaimer, the term of this patent is extended or adjusted under 35 U.S.C. 154(b) by 56 days.

(21) Appl. No.: 14/735,546

(22) Filed: Jun. 10, 2015

Related U.S. Application Data

(60) Provisional application No. 62/010,369, filed on Jun. 10, 2014.

(51) Int. Cl.
| | | |
|---|---|---|
| *G06K 9/34* | (2006.01) | |
| *G06K 9/00* | (2006.01) | |
| *G06K 9/18* | (2006.01) | |
| *G06K 9/62* | (2006.01) | |
| *G06K 9/52* | (2006.01) | |

(52) U.S. Cl.
CPC ....... *G06K 9/00449* (2013.01); *G06K 9/00483* (2013.01); *G06K 9/18* (2013.01); *G06K 9/52* (2013.01); *G06K 9/6202* (2013.01)

(58) Field of Classification Search
CPC .. G06K 9/00449; G06K 9/00483; G06K 9/18; G06K 9/52; G06K 9/6202
See application file for complete search history.

(56) References Cited

U.S. PATENT DOCUMENTS

| | | | |
|---|---|---|---|
| 5,299,269 A | 3/1994 | Gaborski et al. | |
| 6,243,501 B1 | 6/2001 | Jamali | |
| 7,454,371 B2 | 11/2008 | Wyle et al. | |
| 7,610,227 B2 | 10/2009 | Wyle | |
| 7,636,886 B2 | 12/2009 | Wyle et al. | |
| 7,720,616 B2 | 5/2010 | Wyle et al. | |
| 7,769,646 B2 | 8/2010 | Wyle | |
| 7,853,494 B2 | 12/2010 | Wyle | |
| 8,655,075 B2 | 2/2014 | Wyle et al. | |
| 2008/0311551 A1* | 12/2008 | Reed ................... | G06K 9/2063 434/356 |

* cited by examiner

*Primary Examiner* — Phuoc Tran
(74) *Attorney, Agent, or Firm* — Klarquist Sparkman, LLP

(57) ABSTRACT

Image recognition and parsing techniques are provided herein. In the described examples, an input image, such as an image of a document (e.g., a scanned document), can be received. Scan mark candidates in the input image can be identified that correspond to blueprint scan marks for a stored set of form blueprints. The blueprint scan marks can indicate form entry areas or other features of a form associated with the form blueprint. Identified scan mark candidates can be compared with the corresponding blueprint scan marks. Based on the comparing, it can be determined that at least some of the scan mark candidates are confirmed scan marks. Based on the confirmed scan marks, one form blueprint can be identified that corresponds to the input image. Information can be extracted from the input image, for example by optical character recognition, based on the form blueprint to which the input image corresponds.

20 Claims, 14 Drawing Sheets

IMAGE RECOGNITION AND PARSING

CROSS-REFERENCE TO RELATED APPLICATION

This application claims the benefit of U.S. Provisional Application No. 62/010,369 filed on Jun. 10, 2014 and titled "DOCUMENT IMAGE RECOGNITION AND PARSING," which is incorporated herein by reference in its entirety.

FIELD

The present disclosure relates to automated recognition of scanned documents, and to automated retrieval of information from scanned documents.

BACKGROUND

Paper document processing has traditionally been a time consuming task. It has been a daily practice in businesses to handle paper documents manually, incurring several man-hours in the repetitive process of classifying forms and finding desired information thereon. Examples include processing tax returns for income calculation in the lending industries, processing sales invoices for bookkeeping, and comparing quotations from different suppliers. Since the advent of scanning and optical character recognition (OCR) technologies, a number of manual, paper-based tasks have been automated, e.g., for archiving purposes. Challenges remain, however, in the fields of scanned document image recognition and parsing.

SUMMARY

The examples described herein relate to image recognition and parsing. In the described examples, an input image can be received. The input image can be an image of a document (e.g., a scanned document). Scan mark candidates in the input image can be identified that correspond to blueprint scan marks for a stored set of form blueprints. The blueprint scan marks can indicate form entry areas or other features of a form associated with the form blueprint. Identified scan mark candidates can be compared with the corresponding blueprint scan marks. Based on the comparing, it can be determined that at least some of the scan mark candidates are confirmed scan marks. Based on the confirmed scan marks, one form blueprint can be identified that corresponds to the input image. Information can be extracted from the input image, for example by optical character recognition, based on the form blueprint to which the input image corresponds.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

The examples describe herein relate to image recognition and parsing. For example, images of documents (e.g., an image produced by scanning a document) can be recognized as corresponding to one of a set of forms. The forms can include a variety of fields in which individuals typically provide information. When an image has been recognized, for example, as being a filled-out, hard-copy form that has been scanned, desired information can be extracted from the image using known characteristics of the form (e.g., the locations of various fields).

Despite advances in OCR technology, high-precision scanned document recognition and/or classification and accurate identification and extraction of desired information from scanned documents remain challenging. This can be attributed, at least in part, to the fact that scanned document images come from a variety of scanners and in a variety of resolutions. The scanning process can introduce a variety of noise, skewness, and distortion profiles, and affine transformations can result from variation in the orientations of documents during scanning.

The described examples are scale-invariant approaches of automated recognition and parsing of images (e.g., document images) and represent a significant advance in the fields of optical character recognition and image processing. The described examples allow certain features within images to be located and extracted quickly and accurately, reducing the need for extracting characters over an entire image and avoiding re-processing of images having numerous errors, saving both computing processing resources and network bandwidth. The techniques disclosed herein offer precise recognition of even closely related and similar forms that have only small differences in layout, format, and/or content, can detect duplicate images, and can capture significant data contained in different but similar forms. The described techniques are vital to satisfy the new demand for computationally efficient and accurate image processing, document processing, and file format conversions that have specifically arisen with the advent of cloud storage and Internet-based services. Examples of image recognition and parsing are described below with reference to FIGS. 1-14.

Figure 1:
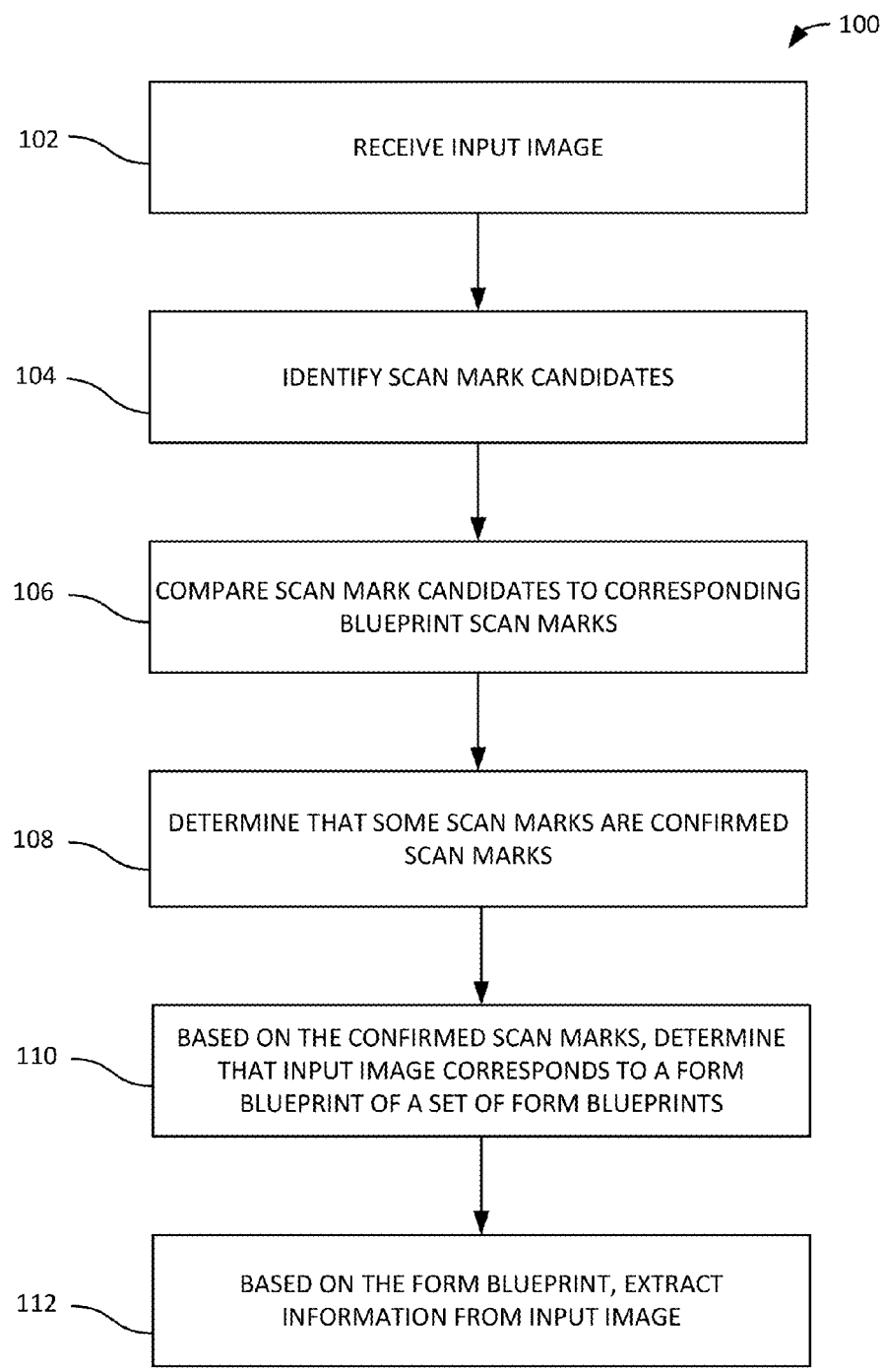
FIG. 1 illustrates an example method of image recognition.
Figure 6:
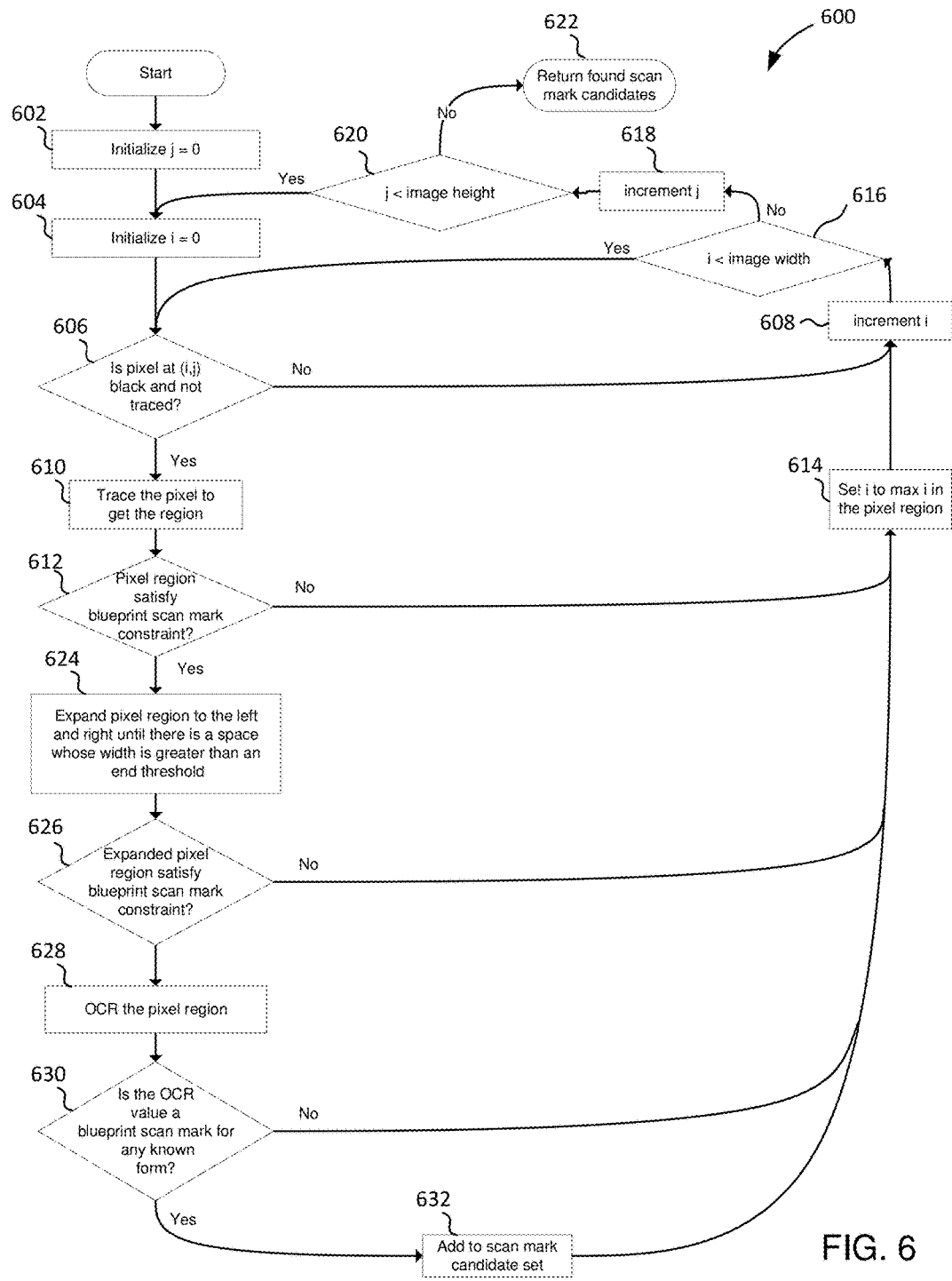
FIG. 6 illustrates an example method of identifying scan mark candidates in an input image.

FIG. 1 illustrates an image recognition method 100. In process block 102, an input image is received. The image can be an image of a document. For example, the input image can be a scanned or photographed version of a hard-copy form that has been filled out. In process block 104, scan mark candidates in the input image are identified that correspond to blueprint scan marks for a stored set of form blueprints. Form blueprints describe a form. Blueprint scan marks can be text features (e.g., characters, words, labels, or titles), graphic features, or other features and can indicate form entry areas or other aspects of interest of the form associated with the form blueprint. Identifying scan mark candidates can include analyzing pixels of the input image and comparing the pixels to known characteristics of the blueprint scan marks for the set of form blueprints. An example scan mark candidate identification method is illustrated in FIG. 6.

In process block 106, identified scan mark candidates are compared with the corresponding blueprint scan marks. In some examples, the respective form blueprints of the set of form blueprints include location information for the blueprint scan marks of the form blueprint. The comparison in process block 106 can be based on locations of the identified scan mark candidates and the location information for the blueprint scan marks. The comparison can determine, for example, how well a predicted location of a scan mark candidate correlates with an actual location. The location information can include, for pairs of blueprint scan marks, distances between the individual blueprint scan marks in the respective pairs. The distances between the individual blueprint scan marks can be normalized as multiples of a unit distance. Detailed examples of comparing identified scan mark candidates and blueprint scan marks are illustrated in, e.g., FIGS. 3 and 7.

Scan mark candidates can represent actual scan marks or can also represent noise. In process block 108, it is determined, based on the comparing, that at least some of the scan mark candidates are confirmed scan marks. In process block 110, based on the confirmed scan marks, it is determined that the input image corresponds to one form blueprint of the set of form blueprints. Determining that the input image corresponds to the form blueprint can be accomplished by calculating recognition scores for the respective form blueprints of the set of form blueprints. The recognition scores reflect a number of scan mark candidates determined to be confirmed scan marks. Identification of the form blueprint to which the input image corresponds can be based on the recognition scores.

Information is extracted from the input image in process block 112. The information extraction is based on the form blueprint to which the input image corresponds.

Figure 2:
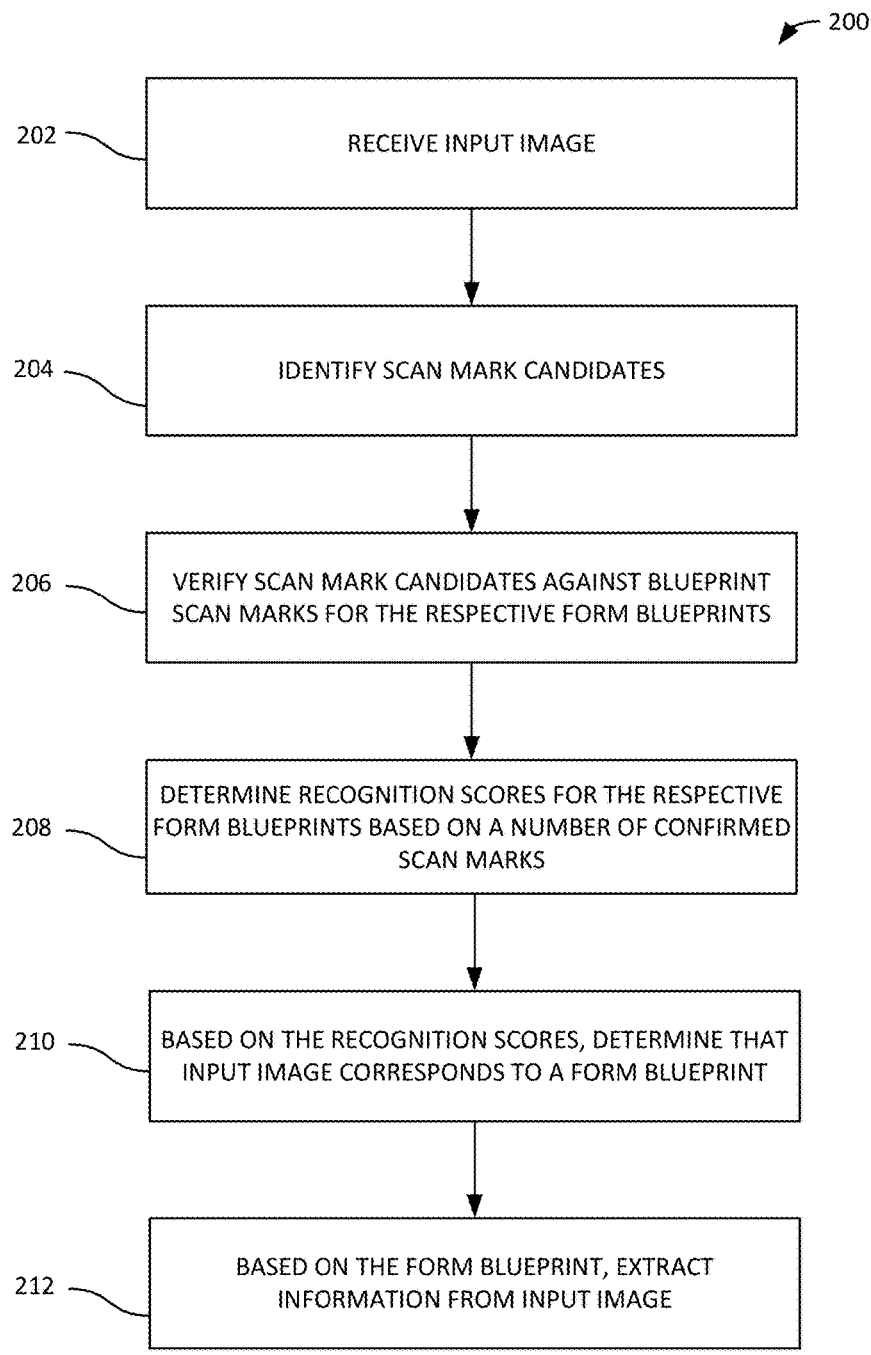
FIG. 2 illustrates an example method of image recognition in which recognition scores are determined for the form blueprints.

FIG. 2 illustrates a method 200 of image recognition and parsing. In process block 202, an input image is received. In process block 204, scan mark candidates in the input image are identified that correspond to blueprint scan marks for a stored set of form blueprints. For the respective form blueprints of the stored set of form blueprints, the scan mark candidates are verified against the blueprint scan marks for the form blueprint in process block 206. An example verification is illustrated by method 300 of FIG. 3. Method 300 can be performed for each of the form blueprints of the stored set.

Figure 3:
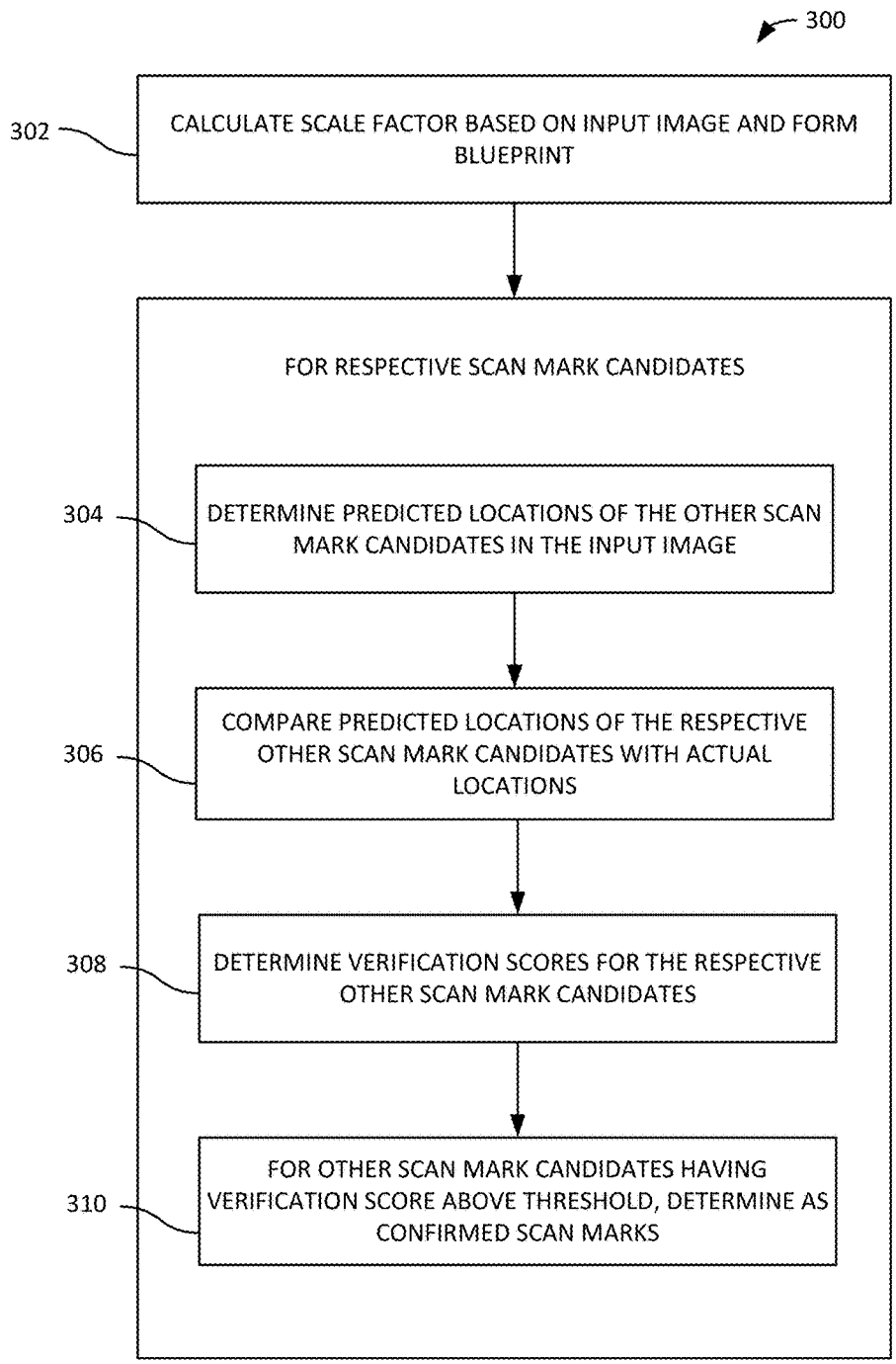
FIG. 3 illustrates an example method of verifying scan mark candidates.
Figure 8:
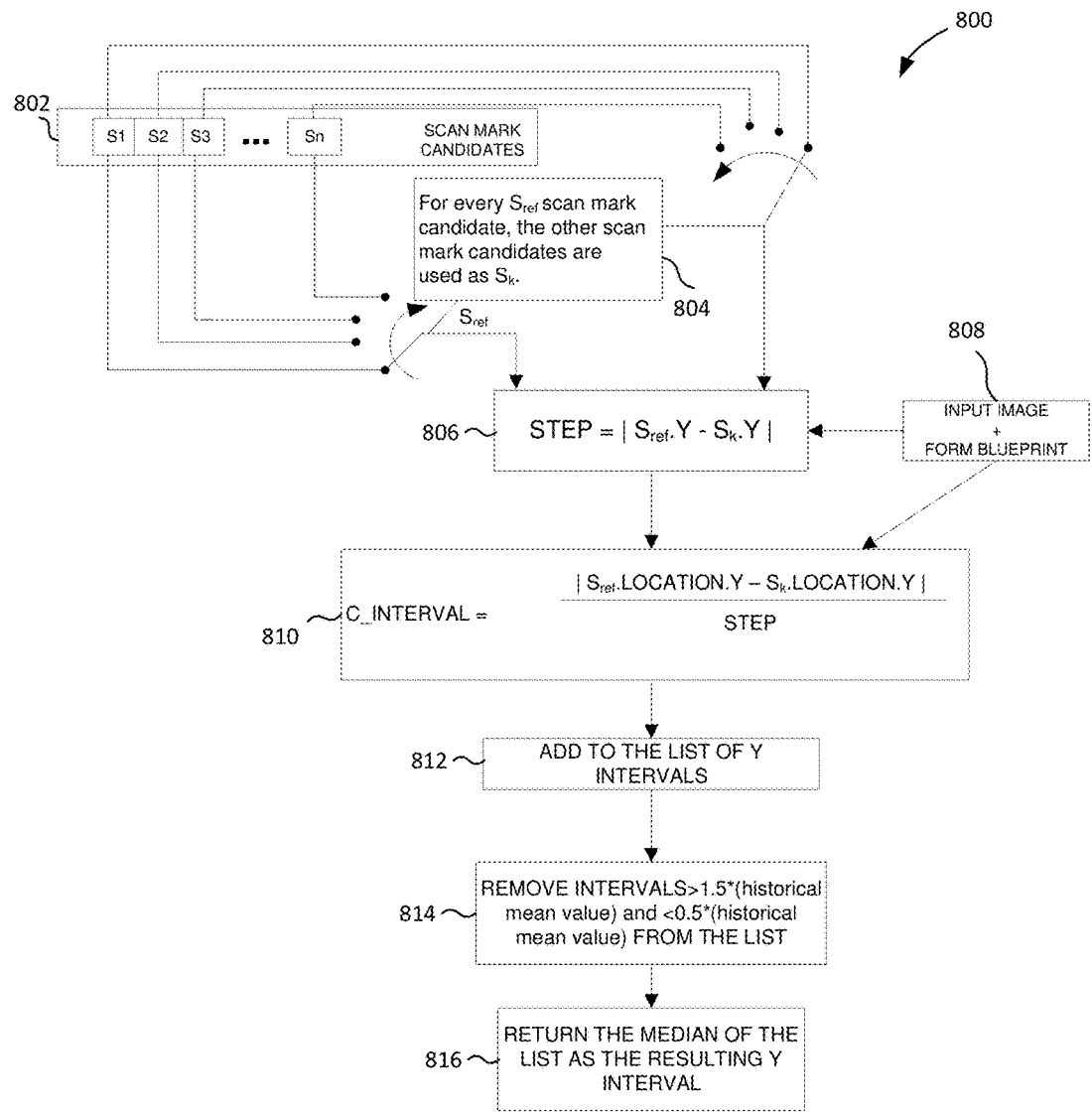
FIG. 8 illustrates an example method of computing a y-interval.

With reference now to FIG. 3, in process block 302, a scale factor is calculated based on the input image and the form blueprint. In some examples, the scale factor for a particular form blueprint is determined by: determining a plurality of individual scale factors corresponding to pairs of candidate scan marks that correspond to the form blueprint; and averaging the individual scale factors to determine the scale factor. A detailed example of calculation of a scale factor (also referred to herein as y-scale factor) is illustrated in FIG. 8.

Process blocks 304, 306, 308, and 310 are performed for the respective scan mark candidates. In process block 304, predicted locations of the other scan mark candidates in the input image are determined based on: the scale factor, an actual location of the scan mark candidate in the input image, and locations of the blueprint scan marks that correspond to the other scan mark candidates. The locations of the blueprint scan marks can be represented as normalized distances between blueprint scan marks.

In process block 306, the predicted locations of the respective other scan mark candidates are compared with actual locations of the other scan mark candidates. Based on the comparing, in process block 308 verification scores are determined for the respective other scan mark candidates. Verification scores can be used to determine whether a scan mark candidate should be confirmed or discarded. In process block 310, for other scan mark candidates for which the verification score is above a threshold, it is determined that the other scan mark candidates are confirmed scan marks. The threshold can be, for example, 0.4, 0.5, 0.6, 0.7, or other number. In some examples, for other scan mark candidates for which the verification score is below a second threshold (e.g., 0.1, 0.05, etc.), the other scan mark candidates are discarded.

Returning now to FIG. 2, in process block 208, recognition scores are determined for the respective form blueprints of the stored set of form blueprints based on a number of confirmed scan marks for the respective form blueprints. For example, the recognition score can be determined as a number of confirmed scan marks for a form blueprint divided by a total number of blueprint scan marks for the form blueprint. Based on the recognition scores, it is determined in process block 210 that the input image corresponds to one form blueprint of the set of form blueprints. For example, the form blueprint having the highest recognition score can be identified as corresponding to the input image. Based on the form blueprint to which the input image corresponds, in process block 212, information is extracted from the input image using optical character recognition. For example, confirmed scan marks (e.g., a form entry label) of the input image can indicate desired information (e.g., information entered in a form entry area corresponding to the label), and the desired information can be extracted.

Figure 4:
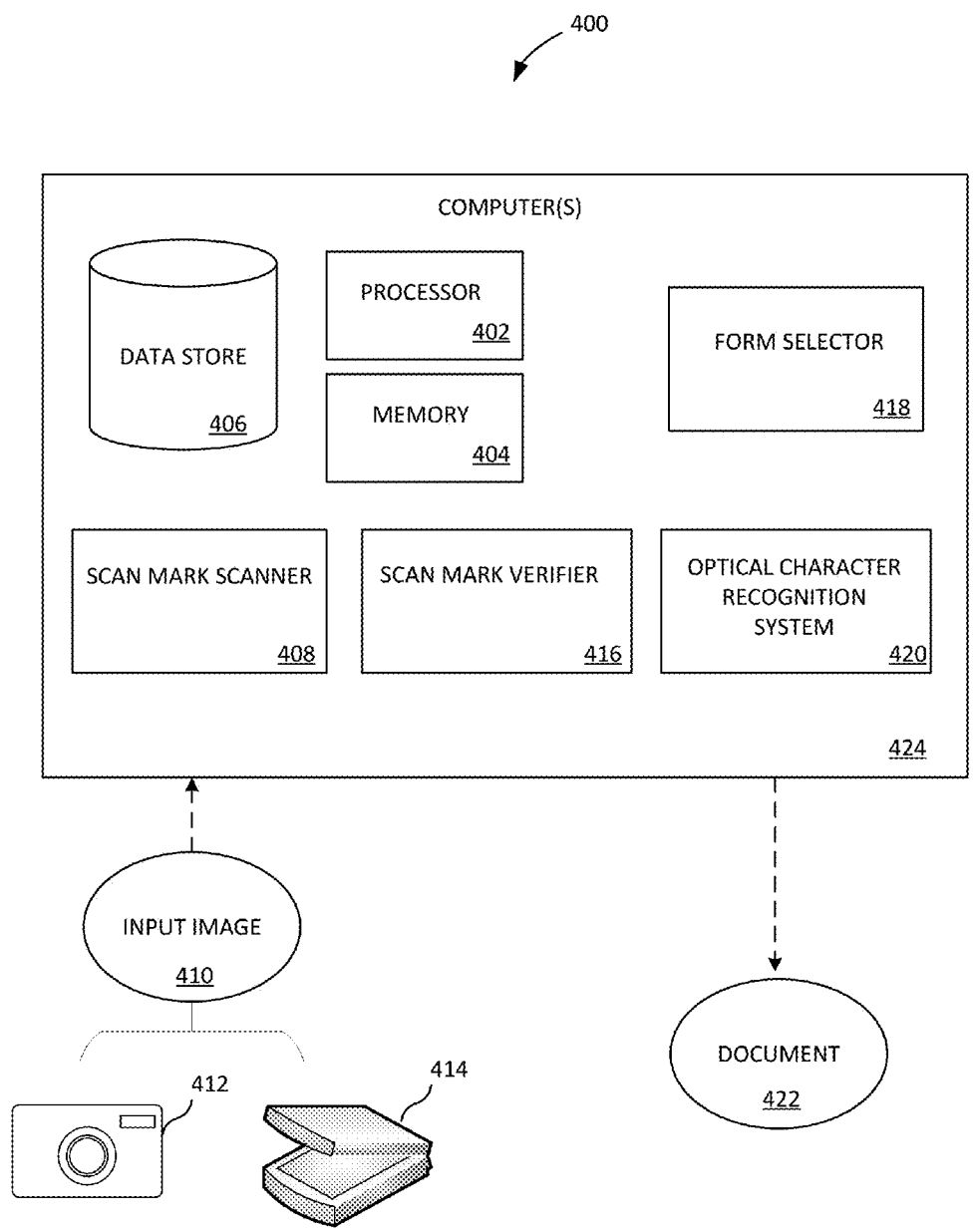
FIG. 4 illustrates an example image recognition system.

FIG. 4 illustrates an image recognition system 400. System 400 comprises a processor 402, a memory 404, and a data store 406. Data store 406 and/or memory 404 are configured to store a plurality of form blueprints. The respective form blueprints have associated blueprint scan marks identifying features of the form blueprint. A scan mark scanner 408 is configured to, by processor 402, identify scan mark candidates in an input image 410 that correspond to at least some of the blueprint scan marks for the plurality of form blueprints. Input image 410 can be generated by a digital camera 412, optical scanner 414, or other optical sensor. Optical scanner 414 can be configured to scan a hard copy input document and generate input image 410.

A scan mark verifier 416 is configured to, by processor 402, compare locations of the identified scan mark candidates with location information of the corresponding blueprint scan marks. Scan mark verifier 416 is further configured to, by processor 402 and based on the comparison, determine that at least some of the scan mark candidates are confirmed scan marks. A form selector 418 is configured to, by processor 402, identify a form blueprint of the plurality of form blueprints to which the input image corresponds. An optical character recognition system 420 is configured to, by processor 402, extract information from input image 410 using optical character recognition based on the form blueprint to which input image 410 corresponds. In some examples, at least some of the blueprint scan marks for the form blueprint to which input image 410 corresponds indicate form entry areas. Optical character recognition system 420 can be further configured to extract the information from input image 410 that corresponds to the form entry areas. A document 422 including information extracted from input image 410 can be generated by system 400.

Processor 402, memory 404, data store 406, scan mark scanner 408, scan mark verifier 416, form selector 418, and optical character recognition system 420 can be part of one or more computers 424 (e.g., a server or client computing device). Scan mark scanner 408, scan mark verifier 416, form selector 418, and optical character recognition system 420 can be configured to perform some or all of the functionality described herein with respect to the other figures. Input images, form blueprints, blueprint scan marks, scan mark candidates, thresholds, and other data can be stored by data store 406 and/or memory 404. Any of the various components of system 400 can be in communication with any other components of system 400.

Figure 5:
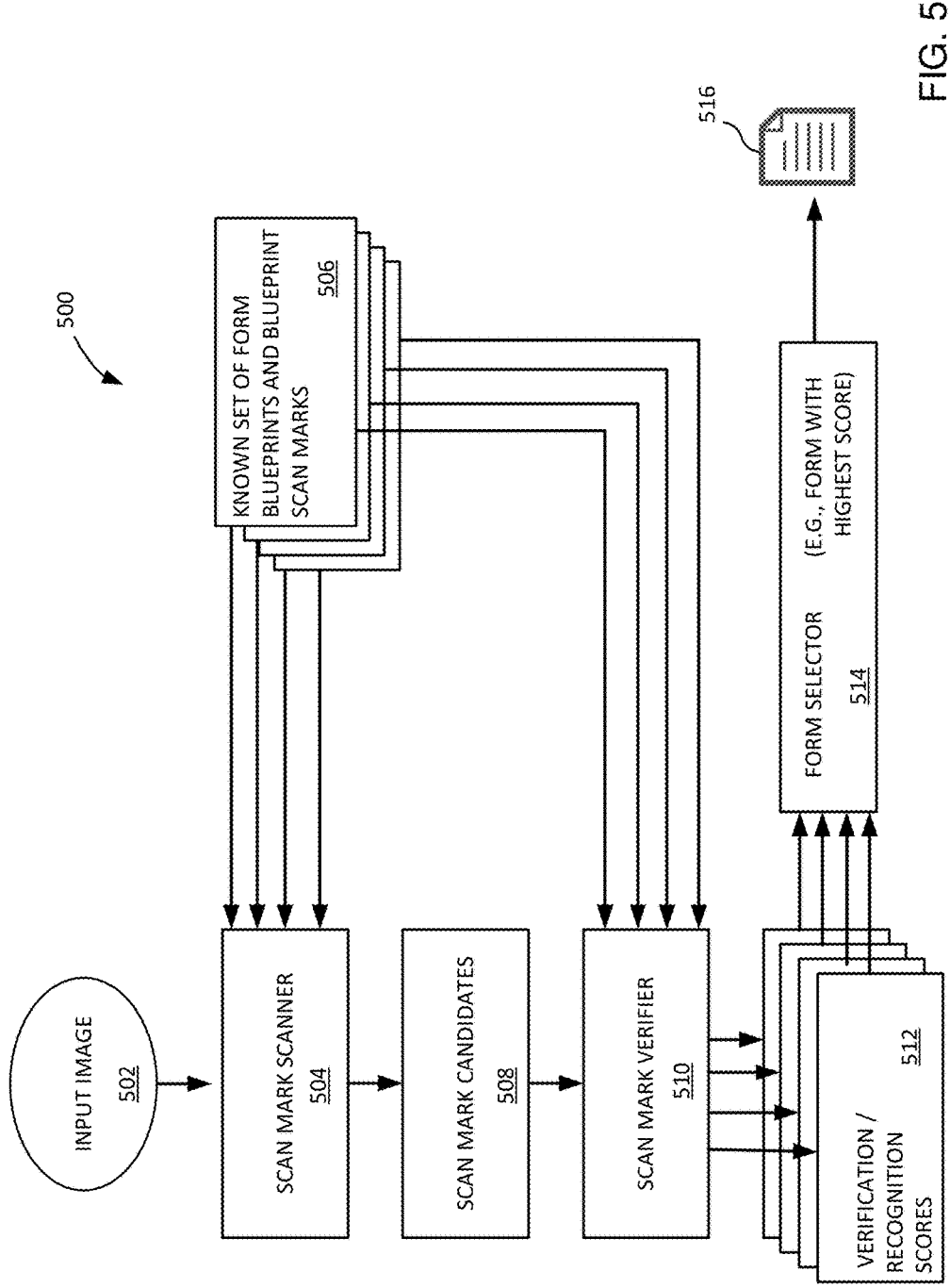
FIG. 5 illustrates the interactions between various components of an example image recognition system.

FIG. 5 shows a process flow 500 illustrating the interaction of some components of an example image segmentation system such as system 400 of FIG. 4. Received images, which can be images of scanned documents, can be preprocessed or otherwise prepared for analysis. For example, the orientation of an image can be checked and corrected. This can be done, for example, using a Fourier transform process to detect image rotation or through manipulation of spatial data to detect the orientation. Once the orientation is corrected, the image can be trimmed, normalized, and/or scaled to a predetermined size. Lines and other noise can also be removed from the image. For example, a received image can be re-oriented, trimmed, normalized, and/or re-sized, to generate a first input image. In some examples, lines can also be removed from the image to generate a second input image. Either the first or the second input image can then be used as an input image 502 that is provided to a scan mark scanner 504.

Scan mark scanner 504 can search input image 502 for blueprint scan marks included in a set 506 of known form blueprints and blueprint scan marks, generating a set of identified scan mark candidates 508 (also referred to as "probable scan marks"). A scan mark verifier 510 can then associate scan mark candidates 508 with the blueprint scan marks of one or more of the form blueprints in set 506 and produce one or more form verification and/or recognition scores 512. As used herein, recognition scores are associated with form blueprints, while verification scores are associated with scan mark candidates, as discussed further below. As shown in FIG. 2, the set 506 of known form blueprints and blueprint scan marks can include four form blueprints, and the scan mark verifier 510 can produce four recognition scores, each associated with a respective one of the four form blueprints. As shown in FIG. 2, a highest recognition score can be determined by form selector 514. Form selector 514 can determine that input image 502 includes the form 516 corresponding to the form blueprint having the highest recognition score.

The identification of scan mark candidates 508 by scan mark scanner 504 can include a process of sequentially examining the pixels of the image by, e.g., beginning with the top left pixel and moving to the right and downwards. When a black pixel is encountered, the process can invoke a tracing algorithm to obtain information regarding the region neighboring the pixel by examining neighboring pixels. The process can include storing the pixels examined by the tracing algorithm in a base matrix so that the sequential examination of pixels need not re-examine these pixels.

The process of searching input image 502 for scan marks can include testing the examined pixel region to assess whether the examined pixel region satisfies one or more pre-determined constraints. A pre-determined constraint can correspond to the properties of the blueprint scan marks of the set 506. For example, a pre-determined constraint can include a minimum and/or maximum number of pixels, a minimum and/or maximum width and height of the pixel region, etc. If the examined pixel region satisfies one or more constraints, the pixel region can be expanded, for example to the left and right, so that adjacent characters, which might be located beside the examined pixel region, can be examined. The expanded pixel region can then be tested to assess whether the expanded pixel region satisfies the one or more constraints.

If the expanded pixel region satisfies the one or more constraints, OCR can be used to determine a character string present in the expanded pixel region. An OCR process can output, for example, a string value, which can be searched for in the set 506. If the set 506 includes a blueprint scan mark matching the string value, then the location of the expanded pixel region in the image (e.g., in x- and y-coordinates) can be recorded together with the string value in a scan mark object. The scan mark object can be added to the list of scan mark candidates 508. The process of searching input image 502 can continue by examining the next unexamined pixel and repeating until the right-bottommost pixel of the image is reached.

FIG. 6 illustrates a specific scan mark candidate identification process 600. As shown in FIG. 6, scan mark identification can begin in process blocks 602 and 604 by initializing variables i (representing a horizontal location) and j (representing a vertical location), respectively, and by examining pixel i, j in process block 606. If the pixel is not black, then i and j can be incremented to the next unexamined pixel location in process block 608. If a pixel is black, then the region neighboring the pixel can be examined in process block 610. In process block 612, it is determined if the region satisfies a constraint corresponding to a blueprint scan mark.

If not, then i and j can be incremented to the next unexamined pixel location in process blocks 614, 608, 616, 618, 620, and 622. If the region does satisfy a constraint, then an expanded pixel region can be examined in process block 624. In process block 624, for example, the pixel region is expanded to the left and right until there is a space whose width is greater than an end threshold. In process block 626, it is determined if the expanded region satisfies a blueprint scan mark constraint. If the expanded region does not satisfy a constraint, then i and j can be incremented to the next unexamined pixel location via process blocks 614, 608, 616, 618, 620, and 622. If the expanded region does satisfy a constraint, then the expanded region can be fed into an OCR process in process block 628. An output from the OCR process can be tested against, e.g., the set 506 of FIG. 5 to determine whether the expanded region contains a scan mark matching a blueprint scan mark in process block 630. If so, the identified scan mark (including its x- and y-locations) can be added to a set 632 of identified scan mark candidates. Next, i and j can be incremented to the next unexamined pixel location, and process 600 can repeat until the entire image has been examined.

The identified scan mark candidates obtained, for example, through process 600 of FIG. 6 can include both noise scan marks and true scan marks. The scan mark candidates can be correlated with (or "verified against") the blueprint scan marks in the form blueprints to determine which of the scan mark candidates are the true scan marks (or "confirmed scan marks").

In some examples, normalized x- and/or y-distances between the blueprint scan marks of the form blueprints can be stored in the form blueprints, e.g., during creation of the form blueprints. Based on these distances, arbitrary x- and/or y-coordinates can be assigned to each blueprint scan mark such that the arbitrary coordinates reflect the normalized distances between the blueprint scan marks of the form blueprints. The coordinates can also be stored in the form blueprints. For example, assume a form blueprint that has four blueprint scan marks, $S_1$, $S_2$, $S_3$, and $S_4$. The distances between each of the blueprint scan marks with respect to the other blueprint scan marks can be stored. (I.e., distances between $S_1$-$S_2$, $S_1$-$S_3$, $S_1$-$S_4$, $S_2$-$S_3$, $S_2$-$S_4$, $S_3$-$S_4$.) The distances can be stored as normalized distances that are multiples of a unit distance. For example, if the smallest distance (e.g. in the y- and/or x-dimension) between blueprint scan marks is 100 pixels (or other unit), then this distance can be normalized to a distance of 1. A distance of 400 pixels can be normalized to a distance of 4, etc. Actual distances and coordinates can also be stored.

For a first form blueprint, the scan mark candidates can be associated with the corresponding blueprint scan marks, e.g., based on the text contained in the respective scan marks. For example, if a scan mark candidate has the same text content as a blueprint scan mark, then the scan mark candidate can be associated with the blueprint scan mark having the same text content. In some cases, more than one scan mark candidate can be associated with a single blueprint scan mark at this point, as some of the scan mark candidates can be noise scan marks.

Figure 7:
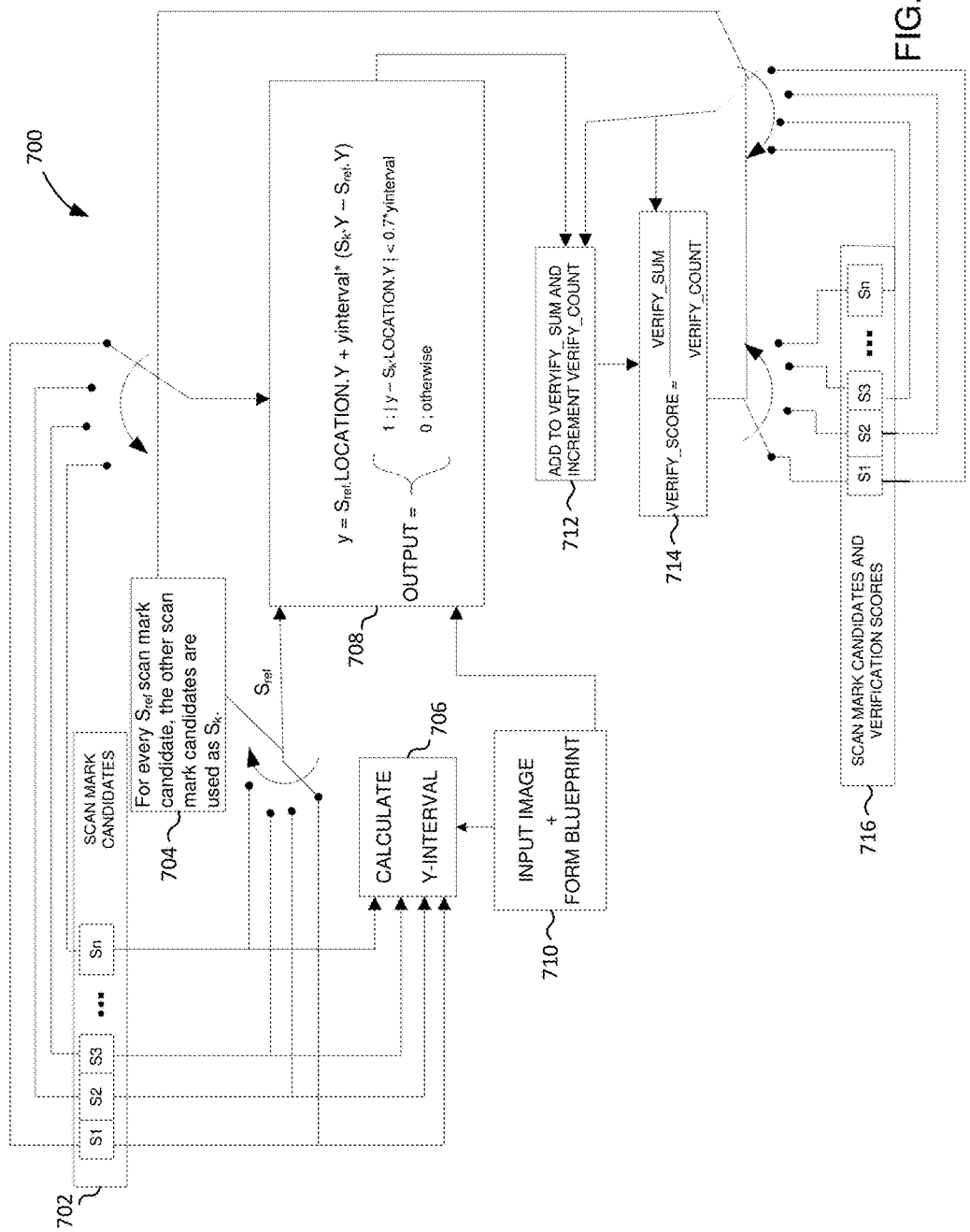
FIG. 7 illustrates an example scan mark candidate verification process.

FIG. 7 illustrates an example scan mark verification process 700. In scan mark verification process 700, a predicted image location (e.g., y-location) of a given scan mark candidate can be calculated based on the actual image location of another one of the scan mark candidates, the form blueprint locations (e.g., y-locations) of the blueprint scan marks corresponding to the two scan mark candidates, and a scale factor (e.g., a median y-scale factor). Scan mark candidates can be verified as confirmed scan marks based on how closely the predicted image location matches the actual image location. Verification of scan marks can be done as an iterative process as shown in FIG. 7, where scan mark candidates can be confirmed, discarded, or remain unverified (e.g., based on a verification score) in each iteration. As the iterations progress, scan mark verification scores for the respective scan mark candidates can be updated, and scan mark candidates corresponding to noise are discarded, and true scan marks are confirmed.

As indicated in process block 704, each scan mark candidate in turn can be a reference scan mark ($S_{ref}$), whose actual location in the input image is assumed to be correct.

The predicted location of the remaining scan mark candidates ($S_k$) relative to $S_{ref}$ are then determined through process blocks 706 and 708. In process block 706, a scale factor is calculated. The scale factor is calculated based on the input image and the form blueprint in block 710. The scale factor is also referred to as a "y-scale factor" when the scale factor is determined using y-locations. The scale factor can also be an x-scale factor or a combination of x/y-scale factor. A "y-interval" has the same magnitude as the "y-scale factor" but also has a unit (e.g., pixels). The distances (e.g. normalized distances) between blueprint scan marks are known, and the scale factor allows the known distance between blueprint scan marks to be applied to an input image of a variety of sizes. A detailed example of calculation of a y-scale factor/y-interval is illustrated in FIG. 8.

FIG. 8 shows a process 800 of calculating a y-interval for a form blueprint and a set 802 of scan mark candidates. As indicated in process block 804, each scan mark candidate in turn can be a reference scan mark ($S_{ref}$), whose actual location in the input image is assumed to be correct. Process 800 can be performed for every pair of scan mark candidates (e.g., $S_1$-$S_2$, $S_1$-$S_3$, $S_1$-$S_4$, $S_2$-$S_3$, $S_2$-$S_4$, $S_3$-$S_4$, etc.) resulting in a list of y-intervals. In process block 806, a step is calculated as the absolute value of the difference in the normalized location of $S_{ref}$ and $S_k$. For example, if in the form blueprint, $S_{ref}$ and $S_k$ are a normalized y-distance of 2 apart (e.g. 2 times a unit distance that is the shortest y-distance between any two scan mark candidates), then the step is 2. The step is determined using locations or normalized distances between blueprint scan marks stored in or in association with the form blueprint.

In process block 810, the current y-interval ("C_INTERVAL") is determined as the absolute value of the actual location of the reference scan mark candidate ($S_{ref}$ LOCATION.Y) in the input image minus the actual location of the other scan mark candidate ($S_k$ LOCATION.Y) in the input image divided by the step. For example, if $S_{ref}$ and $S_k$ in the input image are 200 pixels apart, and the step is 2, then the y-interval is 100 pixels (and the y-scale factor is 100). In process block 812, "C_INTERVAL" is added to a list of y-intervals. In process block 814, a historical mean value is used to remove outliers. For example, values of a calculated y-interval that are greater than 1.5 times the historical mean and/or less than one half of the historical mean are removed from the list of y-intervals. This can remove y-intervals calculated from noise scan marks.

In process block 816, a median y-interval for the list is determined and used as the y-interval. In this way, process 800 can iterate through all of the scan mark candidates identified for the form blueprint, with each scan mark candidate in turn being $S_{ref}$ and for each $S_{ref}$, each of the other scan mark candidates in turn being $S_k$, allowing a y-interval to be calculated for each pair. The median y-interval can be used to represent the y-interval for the form blueprint as a whole. Any of the median y-scale factors used in the iterations of this process (e.g., the median y-scale factor of each iteration, or the median y-scale factor of the final iteration) can be added to a list or database storing the plurality of historical y-scale factors, for use in later analyses.

Returning now to FIG. 7, the calculated predicted image y-location of $S_k$ (shown as "y") in process block 708 is determined by adding the actual location of the reference scan mark candidate ($S_{ref}$ LOCATION.Y) to the y-interval multiplied by the normalized distances between the blueprint scan marks corresponding to $S_{ref}$ and $S_k$. For example, if in the form blueprint, $S_{ref}$ and $S_k$ are a normalized y-distance of 2 apart, and the y-interval is calculated to be 100 pixels, then the predicted location of $S_k$ is 200 pixels from the actual location of $S_{ref}$. Process block 708 outputs a value of 1 if the (absolute value of) the predicted location of $S_k$ in the input image minus the actual location of $S_k$ in the input image ($S_k$ LOCATION.Y) is less than a threshold, such as 70% of the y-interval. If this constraint is not met, a 0 is output. The value of 1 represents that the given scan mark candidate ($S_k$) can be considered to be confirmed for this $S_{ref}$. A predicted image y-location is also determined and compared for $S_k$.

As shown in process blocks 712, 714, and 716, each scan mark candidate can have an associated verification count, an associated verification sum, and an associated verification score. When a predicted image y-location of a scan mark candidate ($S_k$) is calculated and compared to its actual image y-location for an $S_{ref}$, the scan mark candidate's verification count is incremented in process block 714. When a scan mark candidate is considered verified for a pair of scan mark candidates (i.e., for an $S_{ref}$), the scan mark candidate's verification sum is incremented. An identified scan mark's verification score is calculated in process block 714 as the ratio of its verification sum to its verification count.

Figure 9:
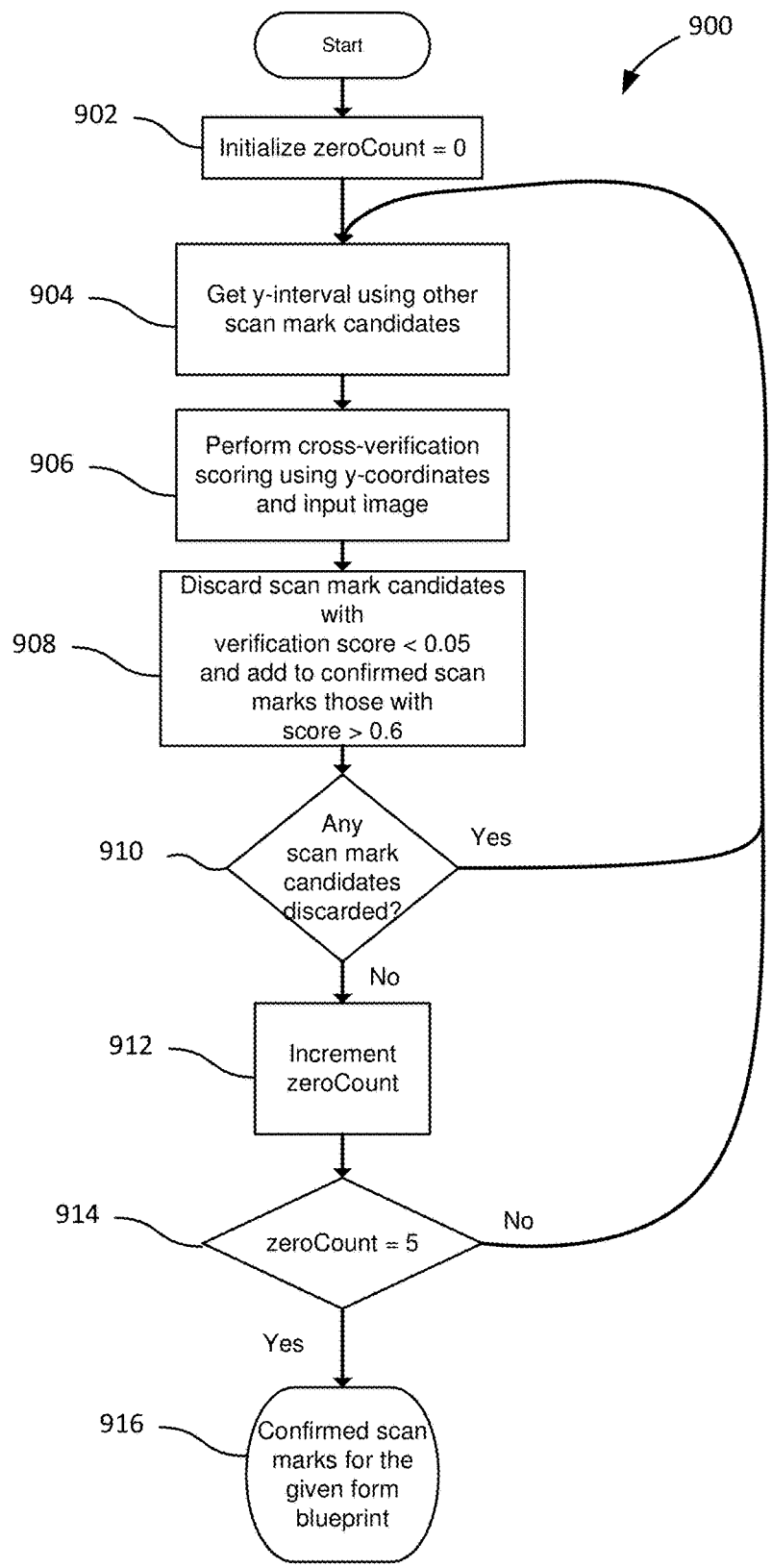
FIG. 9 illustrates an example method of verifying and discarding scan mark candidates.

Once predicted y-locations for the respective scan mark candidates in the input image are calculated and compared (e.g., as described above) for every pair of scan mark candidates, if an scan mark candidate's verification score is greater than a predetermined verification threshold, it can be considered verified for the first form blueprint, and if the identified scan mark's verification score is less than a predetermined discard threshold, it can be discarded. A process of verifying scan mark candidates based on verification scoring using a verification threshold and a discard threshold is illustrated in FIG. 9. The process of calculating the y-scale factors, a median y-scale factor (as illustrated in FIG. 8), and predicting and comparing image y-locations, as described above, can be repeated without the discarded identified scan marks until it has been performed a threshold number of times (e.g., three, four, five, six, etc.).

FIG. 9 illustrates a process 900 of verifying scan mark candidates for a form blueprint. In process block 902, a "zeroCount" variable is initialized to zero. The zeroCount variable tracks the number of iterations during which scan mark candidates are confirmed or discarded. As shown by decision block 914, method 900 iterates until zeroCount equals a threshold number (shown as five). In some examples, the threshold number of times can be a number of iterations without discarding additional scan mark candidates. In some cases, the threshold number of times can be a number of iterations without verifying any additional identified scan marks for the form blueprint. In process block 904, the y-interval is determined. Cross-verification scoring is performed in process block 906 (e.g., as shown in FIG. 7). In process block 908, scan mark candidates with a verification score less than 0.5 are discarded and scan marks with a score greater than 0.6 are confirmed. In decision block 910, it is determined whether any of the scan mark candidates are discarded. If so, method 900 proceeds back to process block 904 without incrementing the zeroCount variable. In such an arrangement, zeroCount is only incremented when no scan mark candidates are discarded. If in decision block 910 no scan mark candidates have been discarded, zeroCount is incremented in process block 912. If zeroCount does not equal five, then process 900 iterates back to process block 904. If zeroCount has reached five, then the confirmed scan marks 916 for the given form blueprint are returned.

As noted above, in some cases, more than one scan mark candidate can initially be associated with a single blueprint scan mark, as some of the scan marks candidates can be noise scan marks. In situations where more than one confirmed scan mark is associated with a single blueprint scan mark after discarding noise scan marks as described above, the confirmed scan mark of the more than one confirmed scan marks having the highest verification score can be retained as confirmed and associated with the single blueprint scan mark, while the remaining confirmed scan marks of this group can be discarded and dis-associated from the single blueprint scan mark. In this way, a one-to-one association between confirmed scan marks and blueprint scan marks can be achieved. The number of confirmed scan marks for the first form blueprint is then known.

The processes illustrated in FIGS. 7, 8, and 9, including associating scan mark candidates with blueprint scan marks, calculating y-scale factors, calculating a median y-scale factor, and predicting and comparing image y-locations a threshold number of times, can be repeated for each of the form blueprints available, for example in the set 506 of FIG. 5. As shown in process 1000 of FIG. 10, once this has been completed for each of the form blueprints, a recognition score can be calculated for each of the form blueprints. In process block 1002, a form blueprint is retrieved. In process block 1004, confirmed scan marks for the form blueprint are retrieved. In process block 1006, a recognition score for the form blueprint is calculated as a number of confirmed scan mark candidates for the current form blueprint divided by a total number of scan mark candidates for the form blueprint. Other recognition score calculation approaches are also possible. In process block 1008, the calculated recognition score is assigned to the current form blueprint. In decision block 1010, it is determined whether there is another form blueprint for which a recognition score has not been assigned. If so, process 1000 iterates back to process block 1002. If no additional form blueprints lack a recognition score, then the recognition scores are returned in process block 1012.

Figure 10:
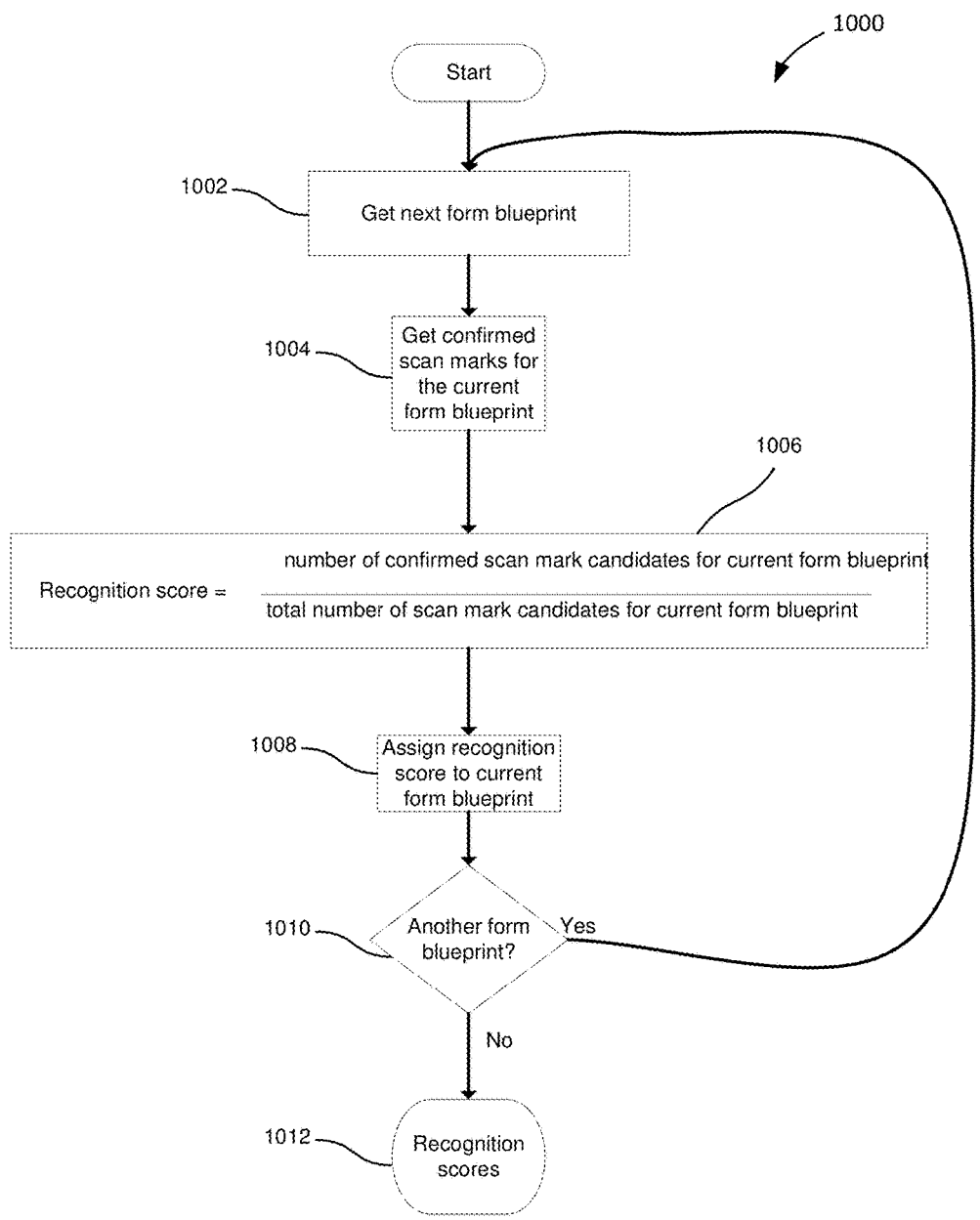
FIG. 10 illustrates an example method of determining recognition scores for a set of form blueprints.

FIG. 10, as the ratio of the number of verified identified scan marks for the form blueprint to the total number of identified scan marks, or as the ratio of the number of verified identified scan marks for the form blueprint to the total number of blueprint scan marks in the form blueprint. In some examples, the form blueprint with the highest recognition score can be considered a recognized form for the input image, and the input image can be identified as including the recognized form. In other embodiments, if the recognition score of the form blueprint with the highest recognition score is higher than a predetermined threshold, then this form blueprint can be considered a recognized form for the image, and the image can be identified as including the recognized form, otherwise, the image can be considered to have an unknown form.

Figure 11:
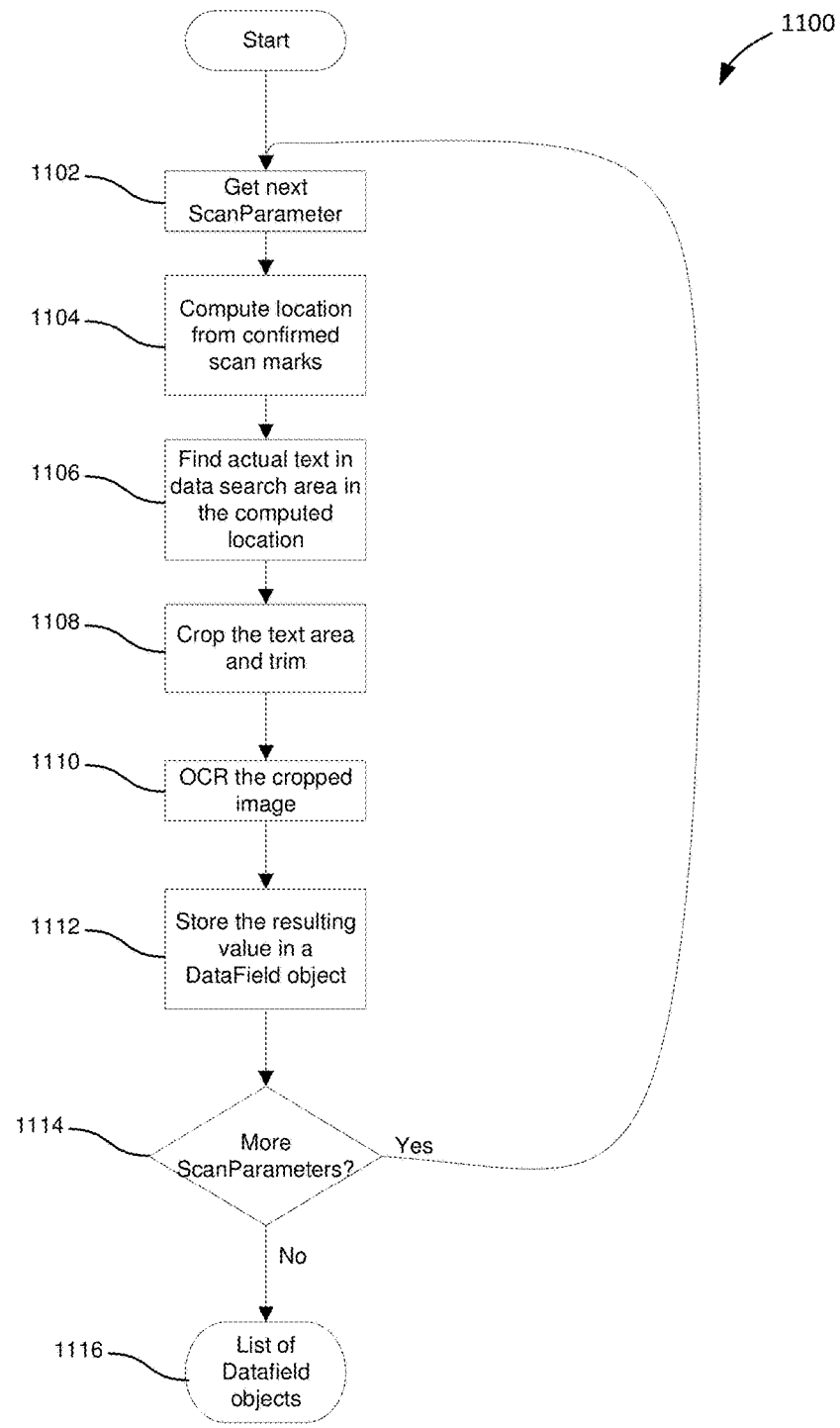
FIG. 11 illustrates an example method of parsing an image.

FIG. 11 illustrates a method 1100 of parsing an image that has been identified as including a form corresponding to a recognized form blueprint. Desired information inside the image can be located using the confirmed scan marks and the recognized form blueprint. For example, the recognized form blueprint can include a scan parameter which can identify a location of desired data in the form with respect to blueprint scan marks of the form blueprint, for example, as within a window of known dimensions, offset from a blueprint scan mark by known x- and y-distances. In process block 1102, the next "ScanParameter" is retrieved. The location in the input image corresponding to the scan parameter is computed in process block 1104 based on the confirmed scan marks in the input image. In process block 1106, the presence of text characters is identified within the region indicated by the scan parameter. In process block 1108, the text area is cropped and trimmed. In process block 1110, OCR is performed on the cropped image to extract the characters. The value of the characters is stored in a "Data-field" object corresponding to the location in the form blueprint or corresponding to the scan parameter. in process block 1114, it is determined if there are additional scan parameters for which corresponding desired information has not yet been extracted from the input image. If so, then process 1100 iterates back to process block 1102. If not, then a list 1116 of stored objects is returned.

Figure 12:
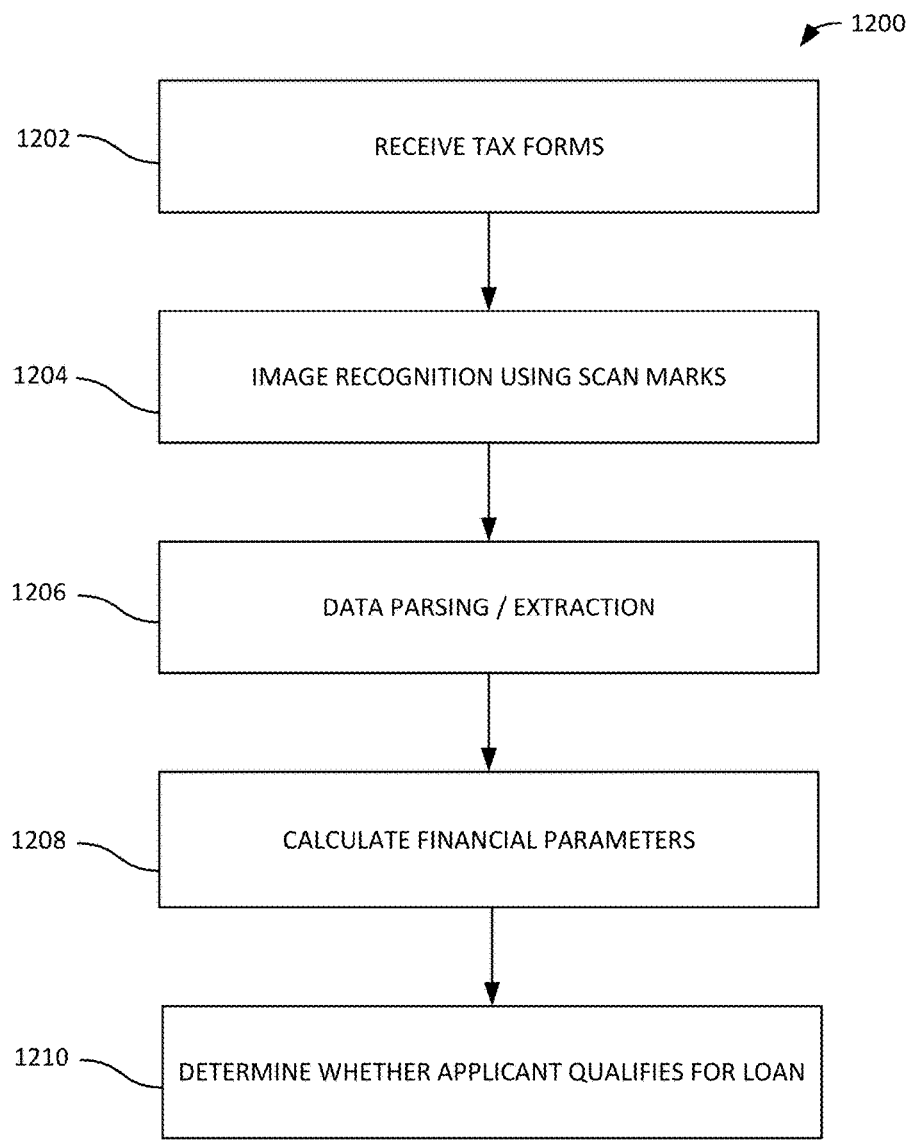
FIG. 12 illustrates an example application of the described techniques.

FIG. 12 illustrates an example of the techniques described herein applied to loan processing. A loan application for an applicant typically involves submission of the applicant's tax forms. In process block 1202, scanned images of tax forms previously prepared by the applicant are received in a digital format. For example, the applicant's previous year's tax forms can be received, or the applicant's last two years of tax forms can be received, or the applicant's last five years of tax forms can be received, or the applicant's last ten years of tax forms can be received. The received tax forms can be received as scanned images of hard copy forms.

Once the applicant's tax forms have been received, an image recognition process using scan marks (e.g., as described in the examples herein) can be performed in process block 1204 to recognize to which of a set of standardized tax forms the received tax forms correspond. For example, the standardized tax forms can include U.S. federal tax forms, U.S. state tax forms, or tax forms of any jurisdiction of interest. As one specific example, the set of standardized tax forms can include U.S. federal tax forms 1040, 1040A, 1040ES, and/or 1040EZ.

Once one of the set of standardized tax forms has been recognized in one of the received tax forms, a data parsing process (e.g., as described herein) can be performed to extract data of interest from the received tax forms in process block 1206. For example, the parsing process can extract data of interest in the processing, evaluating, and approving of a loan application of the applicant. As one specific example, the process can extract the applicant's name, social security number, filing status, and/or income information (including, but not limited to, wages, salaries, tips, taxable interest, tax exempt interest, ordinary and qualified dividends, alimony, business income, capital gains, IRA distributions, pensions and annuities, farm income, unemployment compensation, social security benefits, and/or other income). The locations of the pieces of information can be represented by blueprint scan marks in form blueprints representing the tax forms.

The process of extracting the data of interest from the received tax forms can include using an OCR approach to identify individual characters in the received tax form. Such an OCR approach can make use of segmentation techniques to segment individual characters from one another.

Once the data of interest has been extracted from the received tax form, the data of interest can be displayed or used by a computer to calculate financial parameters of the applicant in process block 1208. The financial parameters can be compared by the computer, programmed to carry out the comparison, against baseline, benchmark, or threshold values to determine, in process block 1210, whether the applicant qualifies for a loan. The results can be displayed on a display or provided in an electronic, paper, or other report.

Example Computing Systems

Figure 13:
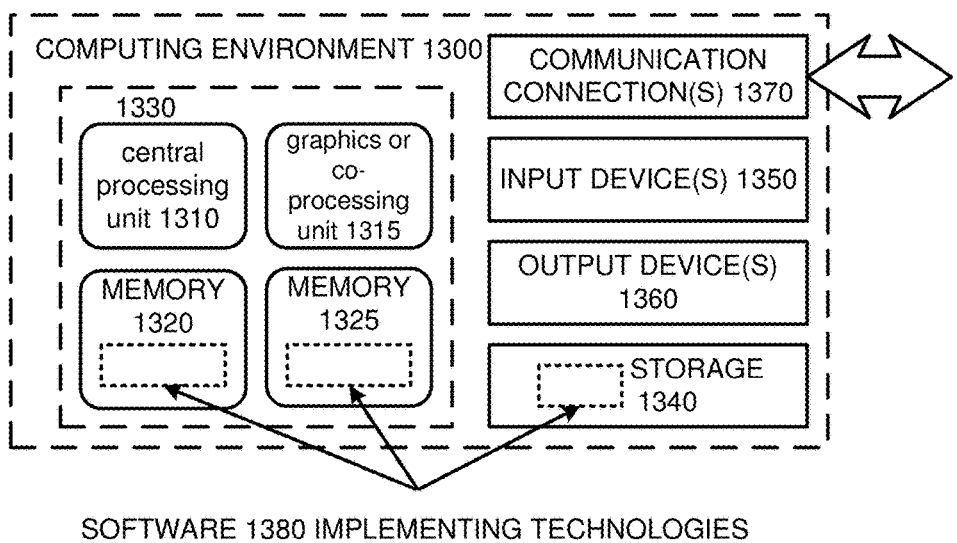
FIG. 13 is a diagram of an example computing system in which some described examples can be implemented.

FIG. 13 depicts a generalized example of a suitable computing system 1300 in which the described innovations may be implemented. The computing system 1300 is not intended to suggest any limitation as to scope of use or functionality, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s). For example, memory 1320, 1325 can store scan mark scanner 408, scan mark verifier 416, form selector 418, and/or optical character recognition system 420 of FIG. 4.

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Cloud Computing Environment

Figure 14:
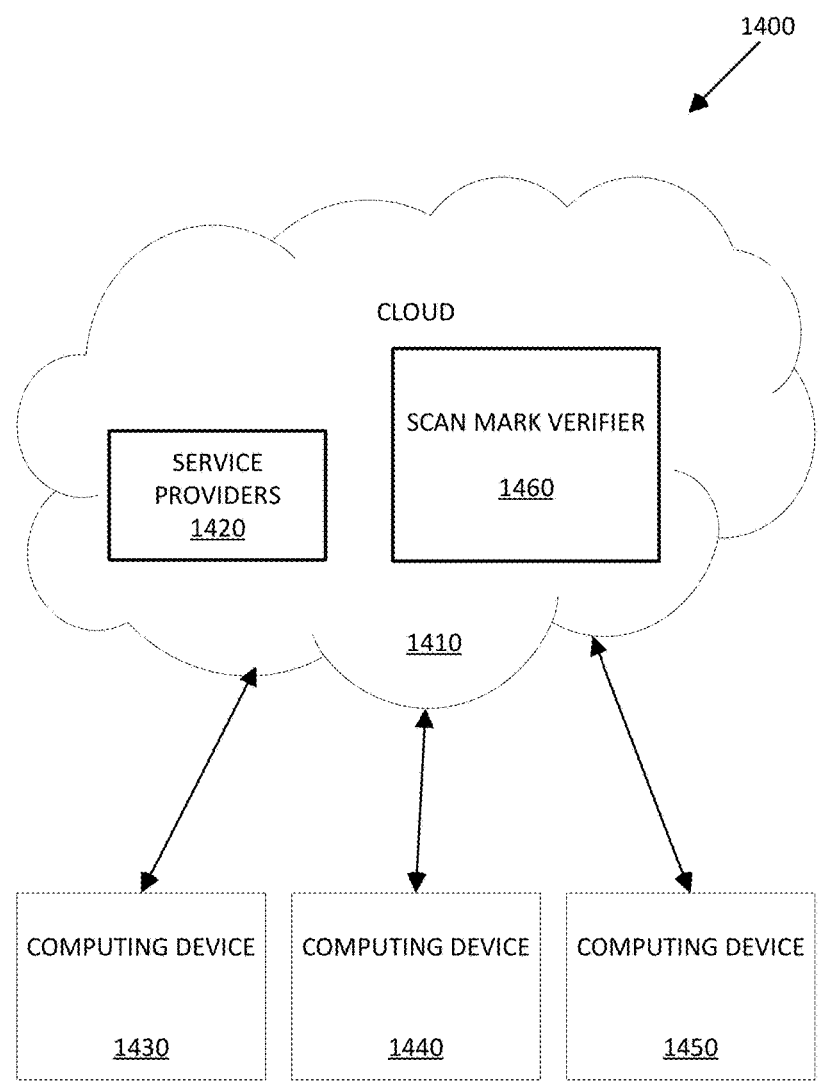
FIG. 14 is an example cloud computing environment that can be used in conjunction with the technologies described herein.

In example environment 1400 of FIG. 14, the cloud 1410 provides services for connected computing devices 1430, 1440, and 1450. Services can be provided by the cloud 1410 through service providers 1420, or through other providers of online services (not depicted). For example, cloud services can be customized to the screen size, display capability, and/or touch screen capability of a particular connected device (e.g., connected computing devices 1430, 1440, 1450).

In example environment 1400, the cloud 1410 provides the technologies and solutions described herein to the various connected computing devices 1430, 1440, 1450 using, at least in part, the service providers 1420. For example, the service providers 1420 can provide a centralized solution for various cloud-based services. The service providers 1420 can manage service subscriptions for users and/or devices (e.g., for the connected devices 1430, 1440, 1450 and/or their respective users). Cloud 1410 can provide, for example, scan mark verifier 1460.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing computer-executable instructions for performing image recognition, the image recognition comprising:
   receiving an input image;
   identifying scan mark candidates in the input image that correspond to blueprint scan marks for a stored set of form blueprints;
   comparing identified scan mark candidates with the corresponding blueprint scan marks;
   based on the comparing, determining that at least some of the scan mark candidates are confirmed scan marks;
   determining, based on the confirmed scan marks, that the input image corresponds to one form blueprint of the set of form blueprints; and
   based on the form blueprint to which the input image corresponds, extracting information from the input image using optical character recognition.

2. The one or more computer-readable media of claim 1, wherein the blueprint scan marks for respective form blueprints of the stored set of form blueprints comprise at least one of text features of the form blueprint or graphic features of the form blueprint.

3. The one or more computer-readable media of claim 2, wherein for at least some of the blueprint scan marks for the respective form blueprints, the text features or graphic features indicate a form entry area.

4. The one or more computer-readable media of claim 1, wherein at least some of the blueprint scan marks for the form blueprint to which the input image corresponds indicate form entry areas, and wherein the information extracted from the input image corresponds to the form entry areas.

5. The one or more computer-readable media of claim 1, wherein identifying the scan mark candidates in the input image comprises analyzing pixels of the input image and comparing the pixels to known characteristics of the blueprint scan marks for the set of form blueprints.

6. The one or more computer-readable media of claim 1, wherein the respective form blueprints of the set of form blueprints comprise location information for the blueprint scan marks of the form blueprint; and wherein the comparing is based on locations of the identified scan mark candidates and the location information for the blueprint scan marks.

7. The one or more computer-readable media of claim 6, wherein the location information comprises, for pairs of blueprint scan marks, distances between the individual blueprint scan marks in the respective pairs, wherein the distances between the individual blueprint scan marks are normalized as multiples of a unit distance.

8. The one or more computer-readable media of claim 1, wherein determining, based on the confirmed scan marks, that the input image corresponds to one form blueprint of the set of form blueprints comprises:
   calculating recognition scores for the respective form blueprints of the set of form blueprints, the recognition scores reflecting a number of scan mark candidates determined to be confirmed scan marks; and
   identifying the one form blueprint to which the input image corresponds based on the recognition scores.

9. An image recognition system, comprising:
   a processor;
   a data store configured to store a plurality of form blueprints, the respective form blueprints having associated blueprint scan marks identifying features of the form blueprint;
   a scan mark scanner configured to, by the processor, identify scan mark candidates in an input image that correspond to at least some of the blueprint scan marks for the plurality of form blueprints;
   a scan mark verifier configured to, by the processor:
      compare locations of the identified scan mark candidates with location information of the corresponding blueprint scan marks;
      based on the comparison, determine that at least some of the scan mark candidates are confirmed scan marks;
   a form selector configured to, by the processor, identify a form blueprint of the plurality of form blueprints to which the input image corresponds; and
   an optical character recognition system configured to, by the processor, extract information from the input image using optical character recognition based on the form blueprint to which the input image corresponds.

10. The system of claim 9, further comprising an optical scanner configured to scan an input document and generate the input image.

11. The system of claim 9, wherein at least some of the blueprint scan marks for the form blueprint to which the input image corresponds indicate form entry areas, and wherein the optical character recognition system is further configured to extract the information from the input image that corresponds to the form entry areas.

12. The system of claim 9, wherein the form selector is further configured to:
   calculate recognition scores for the respective form blueprints of the plurality of form blueprints, the recognition scores reflecting a number of scan mark candidates determined to be confirmed scan marks; and
   identify the form blueprint to which the input image corresponds based on the recognition scores.

13. The system of claim 9, wherein the scan mark verifier is further configured to: for the respective form blueprints of the stored set of form blueprints:
   calculate a scale factor based on the input image and the form blueprint; and
   for the respective scan mark candidates:
      determine predicted locations of the other scan mark candidates in the input image based on: the scale factor, an actual location of the scan mark candidate in the input image, and locations of the blueprint scan marks that correspond to the other scan mark candidates;
      compare the predicted locations of the respective other scan mark candidates with actual locations of the other scan mark candidates;
      based on the comparison, determine verification scores for the respective other scan mark candidates; and
      for other scan mark candidates for which the verification score is above a threshold, determine that the other scan mark candidates are confirmed scan marks.

14. The system of claim 13, wherein the scan mark verifier is further configured to, for the respective scan mark candidates for the respective form blueprints, discard other scan mark candidates whose verification score is below a second threshold.

15. The system of claim 13, wherein the scan mark verifier is further configured to, for the respective form blueprints, determine the scale factor by:
- determining a plurality of individual scale factors corresponding to pairs of candidate scan marks that correspond to the form blueprint; and
- combining the individual scale factors to determine the scale factor.

16. An image recognition method, comprising:
- receiving an input image;
- identifying scan mark candidates in the input image that correspond to blueprint scan marks for a stored set of form blueprints;
- for the respective form blueprints of the stored set of form blueprints, verifying the scan mark candidates against the blueprint scan marks for the form blueprint by:
  - calculating a scale factor based on the input image and the form blueprint; and
  - for the respective scan mark candidates:
    - determining predicted locations of the other scan mark candidates in the input image based on: the scale factor, an actual location of the scan mark candidate in the input image, and locations of the blueprint scan marks that correspond to the other scan mark candidates;
    - comparing the predicted locations of the respective other scan mark candidates with actual locations of the other scan mark candidates;
    - based on the comparing, determining verification scores for the respective other scan mark candidates; and
    - for other scan mark candidates for which the verification score is above a threshold, determining that the other scan mark candidates are confirmed scan marks;
- determining recognition scores for the respective form blueprints of the stored set of form blueprints based on a number of confirmed scan marks for the respective form blueprints;
- based on the recognition scores, determining that the input image corresponds to one form blueprint of the set of form blueprints; and
- based on the form blueprint to which the input image corresponds, extracting information from the input image using optical character recognition.

17. The method of claim 16, wherein the verifying further comprises for other scan mark candidates for which the verification score is below a second threshold, discarding the other scan mark candidates, and wherein the verifying is performed iteratively until all scan mark candidates have been discarded or confirmed.

18. The method of claim 16, wherein the scale factor is a y-dimension scale factor, and wherein the predicted locations and actual locations comprise y-dimension values.

19. The method of claim 16, wherein the recognition score for a form blueprint is determined as a number of confirmed scan marks for the form blueprint divided by a total number of scan mark candidates for the form blueprint.

20. The method of claim 16, wherein the scale factor for a particular form blueprint is determined by:
- determining a plurality of individual scale factors corresponding to pairs of candidate scan marks that correspond to the form blueprint; and
- averaging the individual scale factors to determine the scale factor.

* * * * *